(12) United States Patent
Fang et al.

(10) Patent No.: US 11,950,285 B2
(45) Date of Patent: Apr. 2, 2024

(54) MULTI-CHANNEL VIRTUAL SENSING MECHANISM FOR WIRELESS COMMUNICATIONS

(71) Applicant: ZTE Corporation, Guangdong (CN)

(72) Inventors: Yonggang Fang, San Diego, CA (US); Zhiqiang Han, Guangdong (CN)

(73) Assignee: ZTE Corporation, Guangdong (CN)

( * ) Notice: Subject to any disclaimer, the term of this patent is extended or adjusted under 35 U.S.C. 154(b) by 319 days.

(21) Appl. No.: 17/244,791

(22) Filed: Apr. 29, 2021

(65) Prior Publication Data

US 2021/0251007 A1 Aug. 12, 2021

Related U.S. Application Data

(63) Continuation of application No. PCT/CN2018/114790, filed on Nov. 9, 2018.

(51) Int. Cl.
*H04W 74/08* (2009.01)
*H04W 74/0816* (2024.01)

(52) U.S. Cl.
CPC ............... *H04W 74/0816* (2013.01)

(58) Field of Classification Search
CPC ................................ H04W 74/0816
See application file for complete search history.

(56) References Cited

U.S. PATENT DOCUMENTS

| 2008/0019329 A1* | 1/2008 | Benveniste | H04W 74/06 370/337 |
| 2011/0199966 A1 | 8/2011 | Cordeiro et al. | |
| 2012/0182886 A1* | 7/2012 | Ong | H04W 74/0816 370/252 |
| 2013/0176998 A1* | 7/2013 | Choudhury | H04W 48/12 370/338 |
| 2014/0153417 A1 | 6/2014 | Gupta et al. | |
| 2016/0270079 A1 | 9/2016 | Seok | |
| 2017/0041953 A1 | 2/2017 | Zhou et al. | |
| 2017/0055290 A1 | 2/2017 | Lv et al. | |
| 2019/0059085 A1* | 2/2019 | Sun | H04L 5/0082 |

FOREIGN PATENT DOCUMENTS

| CN | 1649318 | 8/2005 |
| CN | 101102178 A | 1/2008 |
| CN | 104823464 | 8/2015 |

(Continued)

OTHER PUBLICATIONS

Co-Pending Chinese Application No. 201880099393.2, CN Office Action dated May 20, 2022, 19 pages with unofficial translation.

(Continued)

*Primary Examiner* — James P Duffy
(74) *Attorney, Agent, or Firm* — Perkins Coie LLP

(57) ABSTRACT

Techniques for sharing channel availability information using virtual sensing are disclosed. In one example, a wireless communication method includes receiving, by a wireless terminal, a message carrying a multi-channel occupancy information for multiple channels over a wireless communication medium and performing, by the wireless terminal, an access to the wireless communication medium by avoiding collisions using the multi-channel occupancy information.

18 Claims, 14 Drawing Sheets

(56) References Cited

FOREIGN PATENT DOCUMENTS

| | | |
|---|---|---|
| CN | 106455114 A | 2/2017 |
| WO | 2016153163 A1 | 9/2016 |

OTHER PUBLICATIONS

Extended Search Report for EP Application No. 18930489.2, dated Nov. 5, 2021, 9 pages.
Co-Pending Chinese Application No. 201880099393.2, Notification to Complete Formalities of Registration dated Nov. 30, 2022, 4 pages with unofficial translation.
IP Office, China PRC, International Search Report and Written Opinion for PCT/CN2018/114790, dated Aug. 8, 2019.

\* cited by examiner

MULTI-CHANNEL VIRTUAL SENSING MECHANISM FOR WIRELESS COMMUNICATIONS

CROSS-REFERENCE TO RELATED APPLICATIONS

This application is a continuation of International Patent Application No. PCT/CN2018/114790, filed on Nov. 9, 2018, the contents of which are incorporated herein by reference in its entirety.

TECHNICAL FIELD

This patent document relates to wireless communication.

BACKGROUND

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). An infrastructure BSS is the BSS with stations through associating with an Access Point (AP) to connect to the wired network or Internet. In an infrastructure BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, for using a multi-channel virtual sensing mechanism to provide to receiving stations with the information of channel occupancy by the same or different basic service set (B S S) on multiple channels simultaneously so as to improve the receiving stations' carrier sensing performance over multi-channel operation.

In one example aspect, a method of wireless communication is disclosed. The method includes receiving, by a wireless terminal, a message carrying a multi-channel occupancy information for multiple channels over a wireless communication medium and performing, by the wireless terminal, an access to the wireless communication medium by avoiding collisions using the multi-channel occupancy information.

In another example aspect, another method of wireless communication is disclosed. The method includes determining, by an access point of a wireless network, a multi-channel occupancy information for multiple channels available to one or more user terminals in a vicinity of the wireless network, and transmitting, by the access point, the multi-channel occupancy information to the one or more user terminals in a message.

In another example aspect, a hardware platform for implementing one of the above-described methods is disclosed.

In another example aspect, a computer readable medium that stores code embodying the above described methods is disclosed.

Details of the above aspects and their implementations are set forth in the accompanying drawings, the description and the claims.

BRIEF DESCRIPTION OF THE DRAWINGS

FIG. 4A is an example of carrying the multi-channel virtual sensing information in MAC frame header. FIG. 4B is an example of carrying the multi-channel virtual sensing information in an information element. FIG. 4C is an example of carrying the multi-channel virtual sensing information in a modified existing control frame or a new MAC frame.

DETAILED DESCRIPTION

Figure 1:
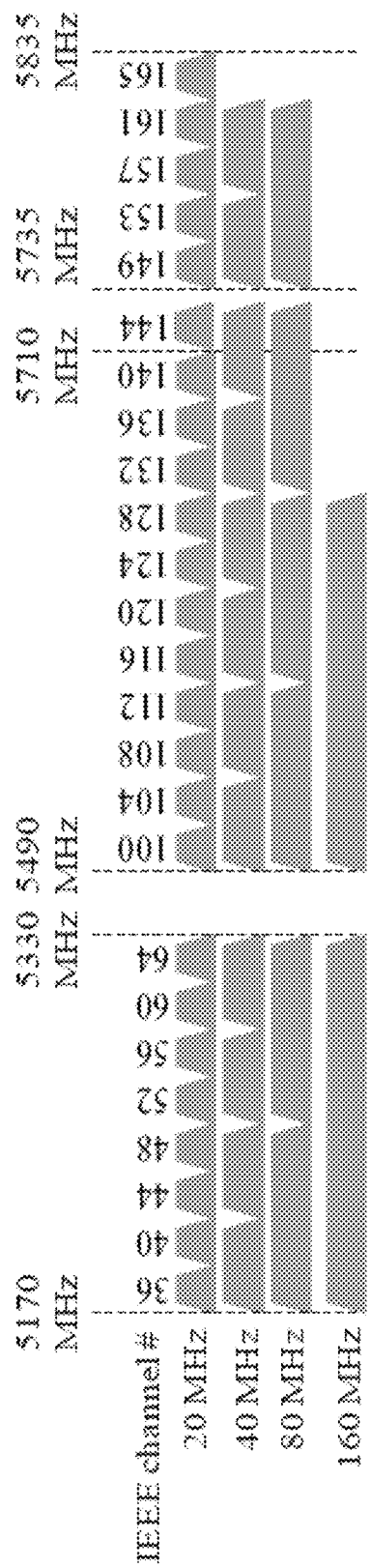
FIG. 1 shows an example of channelization in 5 GHz band.

In the present document, specific references are made to certain wireless communications standards such as IEEE 802.11 only for the sake of understanding of the disclosed technology. The techniques described herein are applicable to other communication standards beyond IEEE 802.11, 5G wireless communication and so on.

In one aspect, a method is provided to transmit a frame carrying the multi-channel virtual sensing information.

In another aspect, a method is provided to transmit a frame carrying multi-channel virtual sensing information for co-located BSS.

In another aspect, a method is provided to transmit a frame carrying multi-channel virtual sensing information for distributed multi-Access Point (AP).

In another aspect, a method is provided for receiving stations to identify the earliest available channel utilizing the multi-channel virtual sensing information so that the receiving stations may schedule the next transmission on the earliest available channel in advance.

In another aspect, a method is provided for receiving stations to identify the available channels of widest bandwidth utilizing the multi-channel virtual sensing information so that the receiving stations may schedule the next transmission on the channel(s) with the widest channel bandwidth in advance.

In yet another aspect, a method is provided for other stations to receive the information of multi-channel virtual sensing and set a network allocation vector (NAV) array on multi-channel accordingly. Therefore, it will prevent from other stations interfering with multi-users transmissions over multi-channels.

In yet another aspect, a method is provided for a non-AP station to request the multi-channel virtual sensing information in the coverage area. Based on the collected information of either directly measured or derived multi-channel virtual sensing results, the AP can share the multi-channel virtual sensing information with this or other station(s) via unicasting or broadcasting.

In another aspect, a method is provided for a station to share the multi-channel virtual sensing information in its transmissions autonomously, i.e. in a management frame, control frame or data frame.

Wireless local area communication is fast becoming a popular mechanism for users to communicate with each other directly or via the internet. Growing popularity of wireless devices such as smartphones and tablets means that, often, at crowded places such as airports, sports venues and even within user homes, multiple wireless device may compete with each other for transmitting data to and receiving data from the shared communication spectrum.

In one popular technique, bases on the air interface specified by the Institute of Electrical and Electronics Engineers (IEEE), standard 802.11 series, devices share a transmission medium using certain set of rules. In IEEE 802.11, the basic service set (BSS) is the building block of a Wireless Local Area Network (WLAN). Wireless stations (also called stations) associated in the radio coverage area establish a BSS and provide basic service of WLAN.

IEEE 802.11 is wireless access specification for operation on license exempt (unlicensed) and/or shared spectrum. A station can operate on a channel in license exempt frequency band such as 2.4 GHz or 5 GHz, or shared frequency band with other services such as 6 GHz. In the 5 GHz band, for example, the usable spectrum is divided into multiple channels for the channel bandwidth of 20 MHz, 40 MHz or 80 MHz, as shown in FIG. 1. For the channelization on bandwidth 20 MHz, at least 25 channels are allocated according to the specification. In 6 GHz band, there are about 50 channels for 20 MHz channel bandwidth.

A station can normally operate on one frequency channel for the single radio, or multiple channels for multiple radios. In order to operate on a channel in the license exempt or shared bands, a station first needs to find a good operation channel, e.g., less load or interference from multiple channels in the 5 GHz and/or 6 GHz bands, for example. A typical way to discover an available channel is through channel scanning, such as passive scan or active scan.

The passive channel scan mechanism is to listen to a beacon frame transmitted by an AP periodically over an operational channel, and then switch to another channel to continue monitoring a beacon frame on that channel until complete scanning beacon frames over all the channels in the band(s). As a beacon frame is normally transmitted only at every certain time (for example 100 ms), it will take a long time for a station to complete the passive channel scan on all the channels.

The active scan mechanism, on the other hand, is based on the scanning station broadcasting a Probe Request message. If this message is received by neighbor APs, the APs shall send Probe Response(s) in a given time period. In this way, it will reduce the scanning station's waiting time in the passive scan. Based on the Probe Response message(s), the scanning station may get the information about BSS and decide whether or not to associate with this AP.

However, no matter passive or active scan, it typically will take a long time for a station to scan all the available channels in operation bands, and consume much air time or capacity, especially in the dense deployment scenario. In addition, as IEEE 802.11 based stations operate on unlicensed bands, the channel condition such as access traffic loads on different channels may change from time to time. Therefore, the existing passive or active scan mechanism would not be able for a station to quickly and dynamically adapt to such channel change condition.

IEEE 802.11 is a contention based asynchronous wireless transmission protocol. A station applies the carrier sensing mechanism defined in IEEE 802.11 called CSMA/CA to contend the medium. Every station which intends to access to the medium for transmission of data packet shall listen to the medium first.

Figure 2:
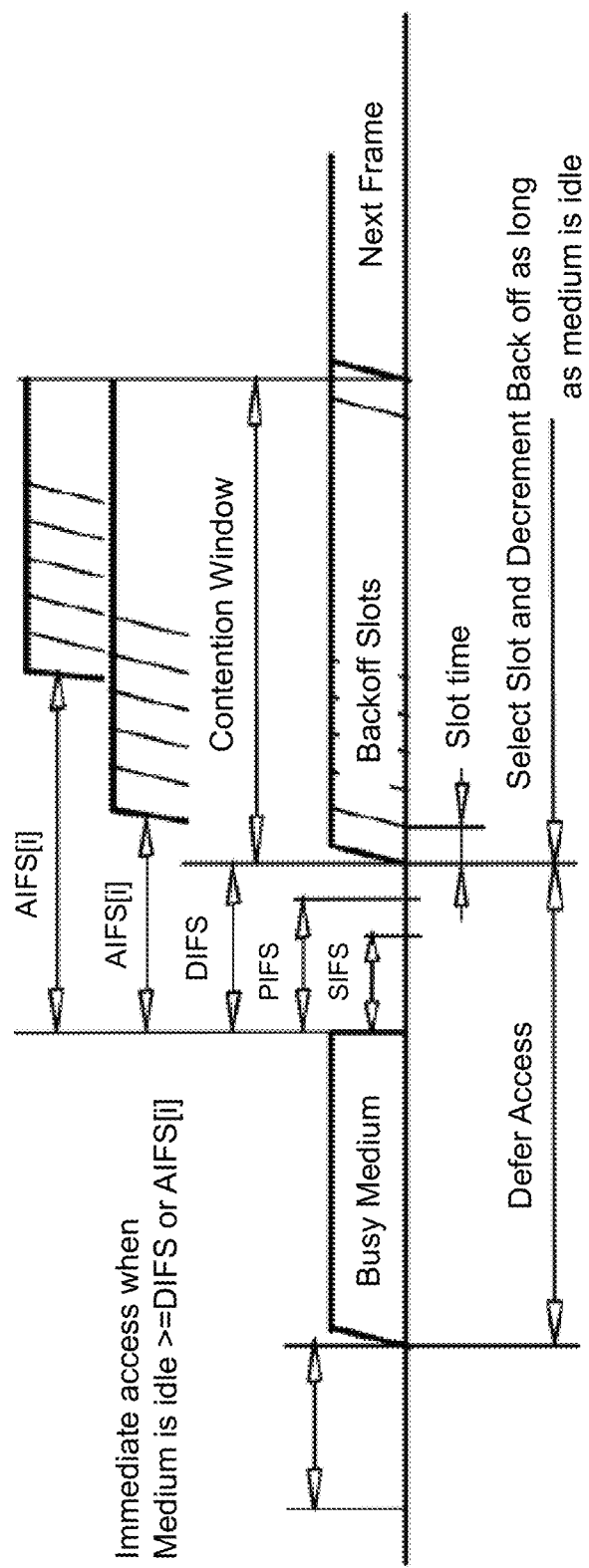
FIG. 2 shows an example of prior art EDCA mechanism of IEEE 802.11.

FIG. 2 illustrates an example of an EDCA mechanism used in the current 802.11 networks. A station senses the medium initially. If the medium is sensed busy, the station defers its transmission until the medium is determined as idle plus a period of time equal to xIFS (interframe space) when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

When the multiple stations access to medium for transmissions via CSMA/CA simultaneously, the channel usage efficiency will drop significantly because either access attempts from multiple stations may collide each other or there are many empty time slots due to the backoff time in the EDCA mechanism.

To solve these issues of multiple stations over multiple channels, this application discloses a new multi-channel virtual sensing (MCVS) mechanism for stations to quickly identify one or more potential available channels in advance and schedule a transmission on those channels which could be in the same or different channel bands. The new multi-channel virtual sensing mechanism can be quickly adaptive to the change of channel condition on multi-channel simultaneously.

Figure 3:
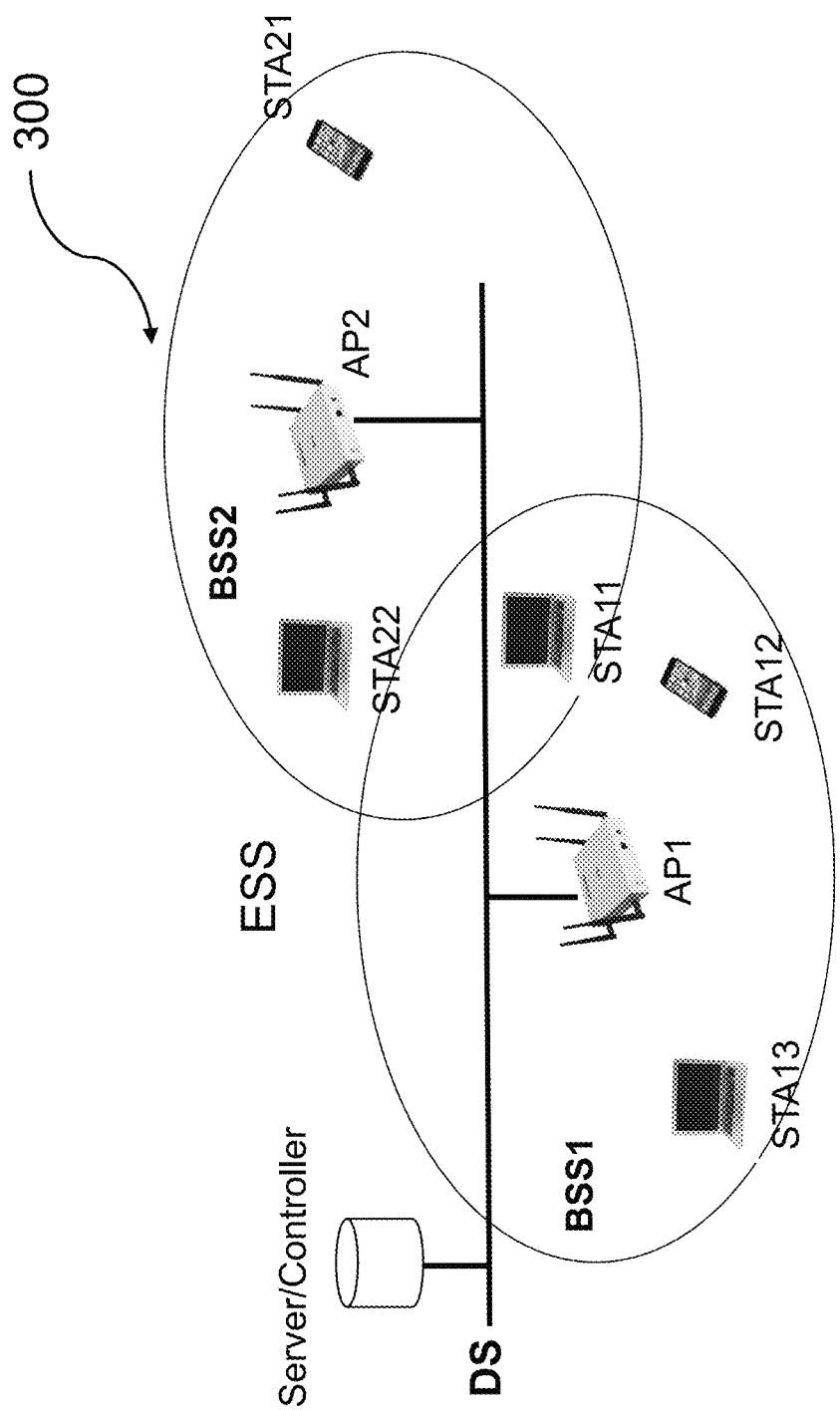
FIG. 3 shows an example of infrastructure BSS.

FIG. 3 illustrates an example of infrastructure BSS 300. BSS1 and BSS2 are infrastructure BSSes. BSS1 contains one access point (AP1) and several non-AP stations, STAl1, STA12, and STA13. The AP1 maintains associations with stations STAl1, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server or switch through a distribution system (DS) to form an Extended Service Set (ESS). Multiple BSS, i.e. BSS1 and BSS2 could be independently operated or coordinated via a controller.

In some embodiments, the multi-channel virtual sensing mechanism provides a new way for channel sensing. It allows a station to share the information which is derived from the received duration field of PPDU header and the information of multi-channel virtual sensing sent by other stations.

Figure 4A:
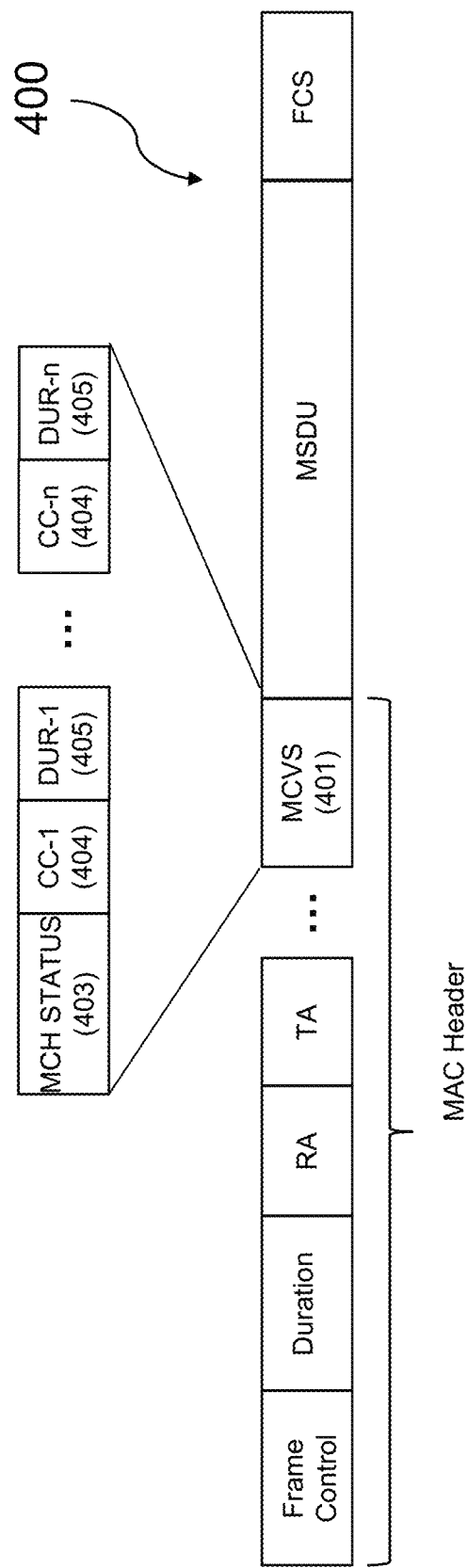
FIGS. 4A-4C show an example of MAC frame structure for carrying multi-channel virtual sensing information.

FIG. 4A illustrates an example of MAC frame format for carrying the multi-channel virtual sensing information. A MAC frame (400) may carry an MCVS information field (401) in MAC header. The MCVS field may contain:

A) MCH STATUS (403): It is a mandatory subfield containing a table of occupancy state for an individual channel in multi-channels in same or different bands. The individual channel state can be Idle state: If the channel is idle, then the corresponding CC and DUR field is omitted.

Busy state: If the channel is busy, the corresponding CC and DUR field shall be set to the occupancy duration by BSS for that channel accordingly.

B) CC (404): The Color Code field, a short format of BSS ID, represents the BSS which is occupying the channel.

C) DUR (405): This field contains the occupancy duration of the channel with the busy state.

As the MCVS information is included in the MAC header, the receiving station may check the MCVS information after receiving MAC header and take an appropriate action if needed.

In order to assist the receiving stations to validate the received MCVS information and avoid such validation to be performed at the end of the MAC frame, the transmitting station may optionally insert a special error checking field right after the MCVS field. This special error checking field may validate the received MAC header and/or correct its error(s) if needed.

Figure 4B:
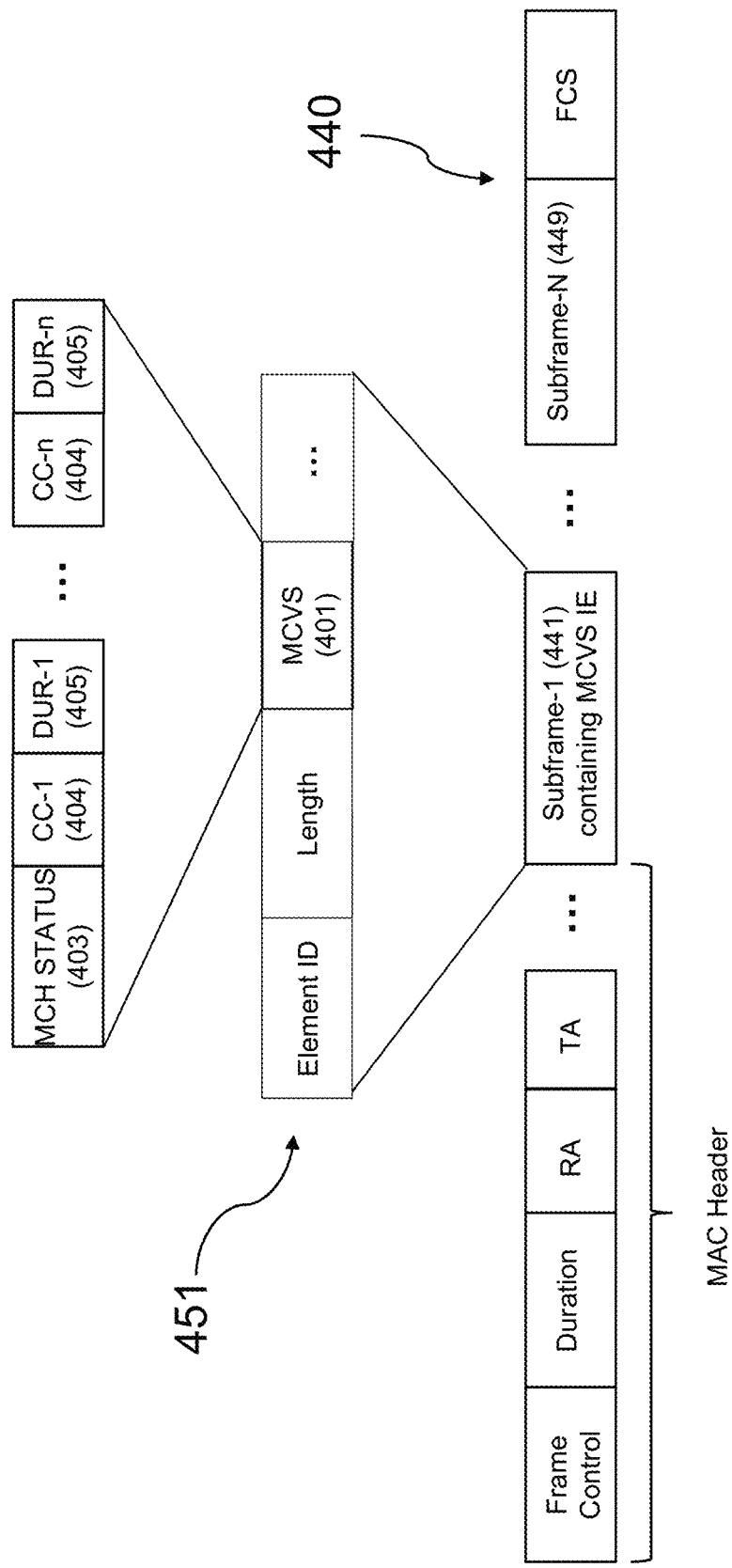

FIG. 4B illustrates another example of MAC frame format for carrying the multi-channel virtual sensing information in a subframe. A MAC frame (440) may consist of one or more subframes such as subframe-1 (441) and subframe-N(449) shown in the Figure. The subframe-1 (441) may carry the MCVS information in an Information Element (IE) (451), which consists the Element ID, Length, MCVS (401) and other fields. The MCVS (401) field is the same as shown in FIG. 4A. The subframe (441) which carries the MCVS IE (451) may be included in the MAC frame right after or close to the MAC header in order for the receiving station to get the MCVS information earlier and prepare an appropriate action if needed.

Figure 4C:
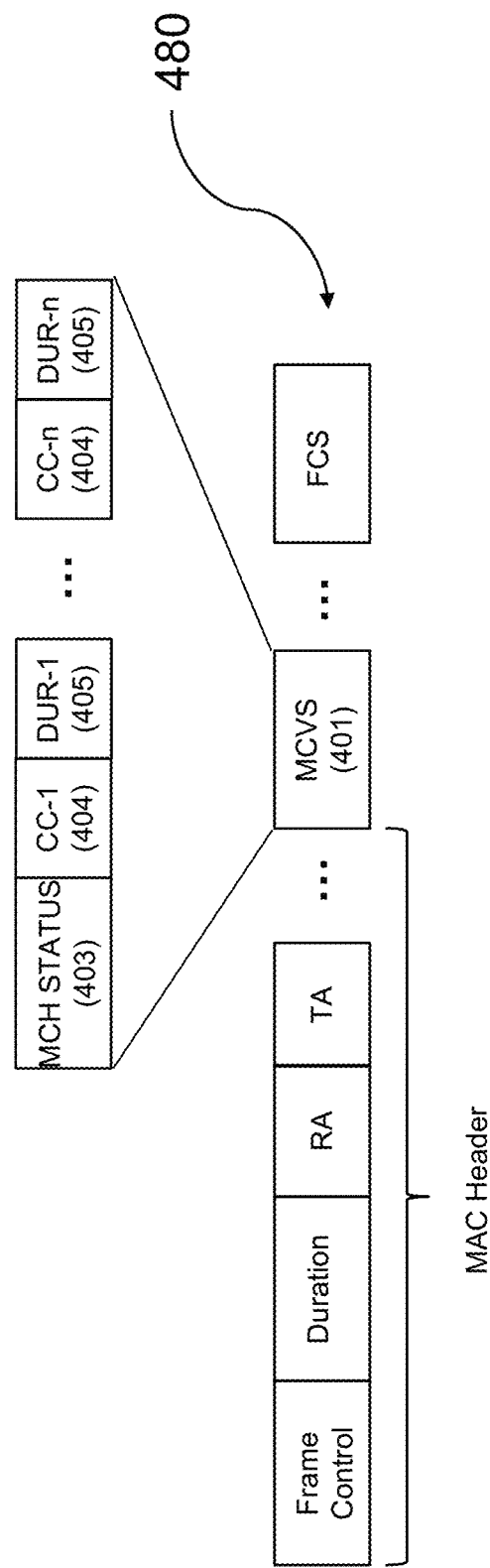

FIG. 4C illustrates another example of MAC frame format for carrying the multi-channel virtual sensing information. The MAC frame (480), in some embodiments, a control frame such as a trigger frame or a trigger-based response frame, etc., carries the information of MCVS (401), and relies on the FCS of MAC frame to do the validation and error correction for MCVS. The MAC frame (480) for multi-carrier virtual sensing can be transmitted as an independent control frame.

In some embodiments, the MCVS information can be carried in any of those frame formats by a non-AP station or an AP station.

In some embodiments, the MCVS mechanism can be used for stations to access one or more of the multi-channels in the co-located BSS deployment.

Figure 5:
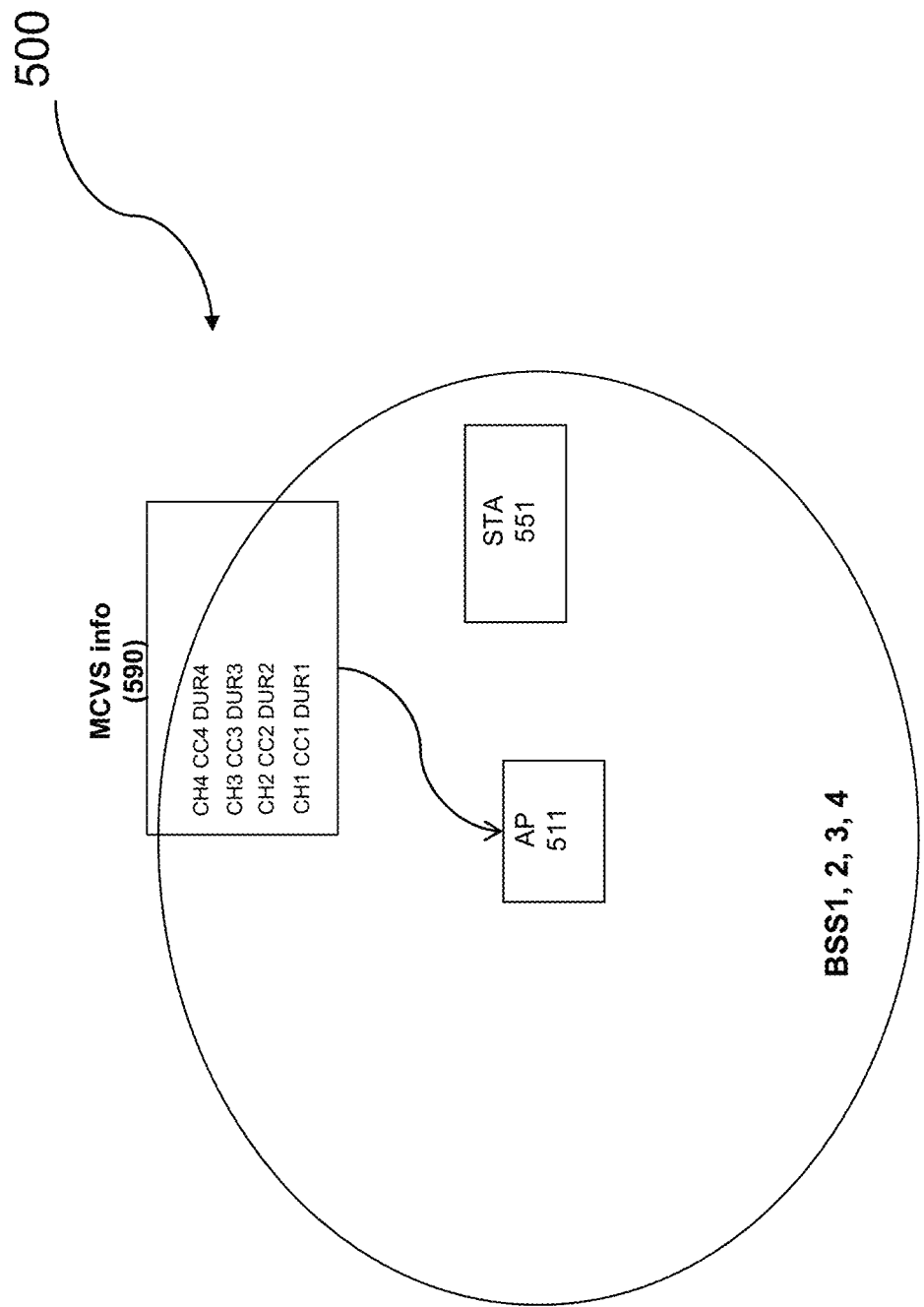
FIG. 5 shows an example of using multi-channel virtual sensing mechanism in the co-located BSS deployment case.

FIG. 5 illustrates an example of using the multi-channel virtual sensing mechanism in the co-located BSS deployment. In the co-located BSS deployment, the AP (511) supports multi-channel operation on the channels CH1, CH2, CH3 and CH4 and forms the multi-BSS: BSS1, BSS2, BSS3 and BSS4 in the same coverage area.

The station STA (551) is in the coverage area of co-located BSS of AP (511). The AP (511) transmits the MCVS information (590) in a MAC frame, such as trigger frame, or management or data frames over the channel CH1. It may optionally transmit the MCVS information (590) in MAC frame on other channels as well.

The MCVS field (590) carries the occupancy information of multi-channel: CH1, CH2, CH3 and CH4, and indicate the occupancy duration of these busy channels.

When a STA (551) receives the information of MCVS (590) from the AP (511), it knows the status of entire multi-channel in the co-located BSS.

In some embodiments, the MCVS information (590) can be used to indicate the earliest available channel(s) of the multi-channel in the co-located BSS deployment.

Figure 6:
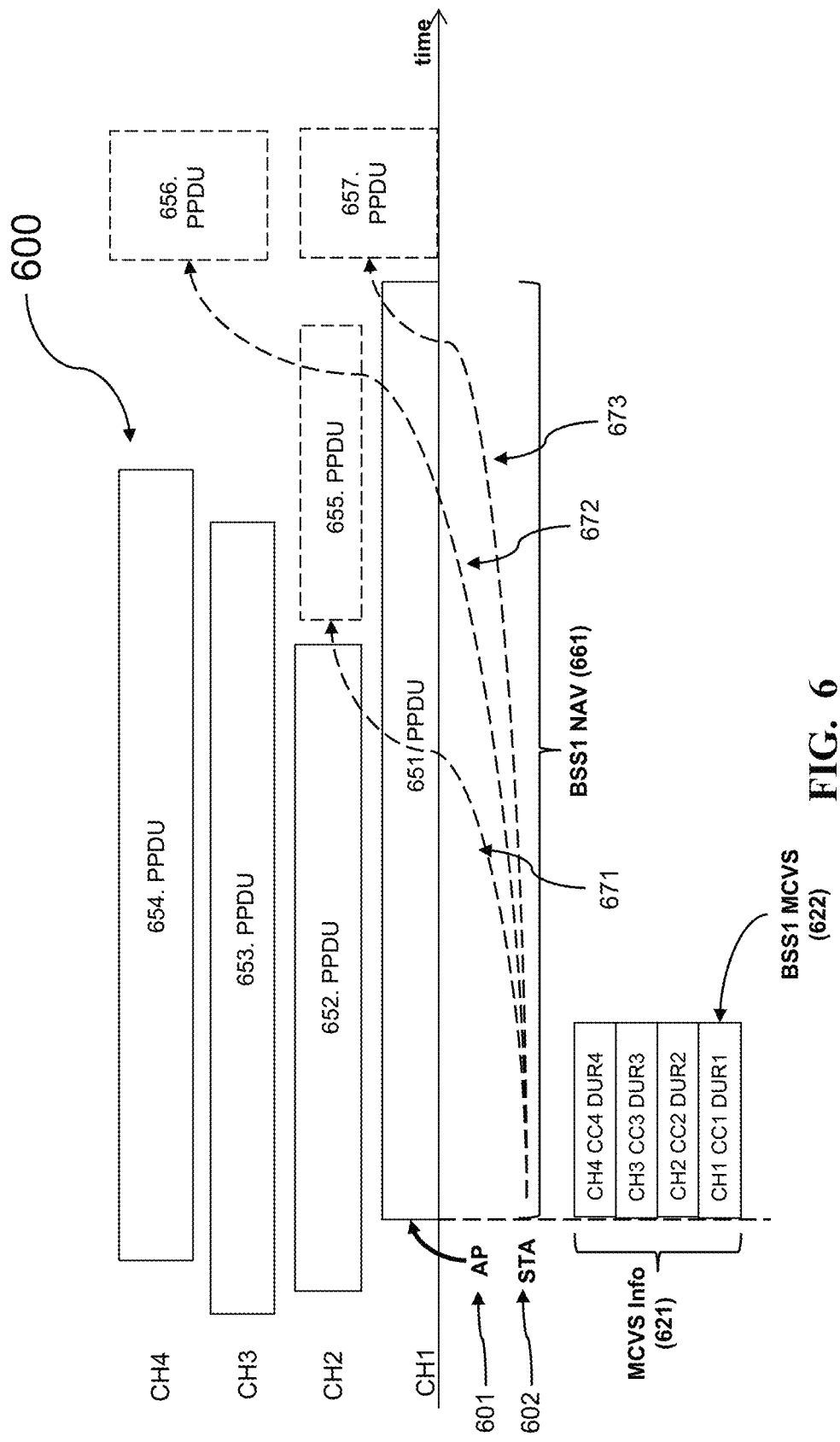
FIG. 6 shows an example of transmitting a frame with multi-channel virtual sensing information and performing the advance scheduling on multi-channel.

FIG. 6 shows an example of transmitting a MAC frame with the MCVS information. The AP (601) and STA (602) are operating on the channel CH1. The MCVS field (621) transmitted by the AP (601) identifies the channel occupancy information on channel CH1, CH2, CH3 and CH4, which could be occupied by BSS1 (on CH1) (622) or other BSS. The channel CH1, CH2, CH3 and CH4 may be in the same frequency band of 2.4 GHz, 5 GHz or 6 GHz band, or may be in different frequency bands, e.g., CH1 and CH2 may be in 5 GHz band, while CH3 and CH4 may be in 6 GHz band. The MCVS information (621) provides the receiving stations the real-time virtual sensing (through DUR fields) on multi-channels at same time. With such information, the receiving station may choose an appropriate way to access to multiple channels.

In some embodiments, a station which receives the MCVS information (621) may switch to the earliest available channel (671) e.g. CH2 which has a shorter occupancy duration specified by MCVS field (621) in this example. Therefore, the station (602) may gain faster channel access (655) than waiting for the current transmission completion on the channel CH1.

In some embodiments, the receiving station may also use the DUR values in MCVS field (621) to maintain a set of NAV timers, i.e. NAV array. If the receiving station finds that the frame carrying the MVCS information is addressing to itself, it shall not update its NAV array on the operating channel. Instead it shall process the received frame. Otherwise, if the received frame is for other station(s), the station shall update its NAV array on the corresponding channels specified by the received MCVS field.

As illustrated in FIG. 6, the AP (601) may transmit a PPDU carrying MCVS information (621). A receiving station (602) finds this frame is not for itself, and then set up its NAV array. Based on the expiration of NAV array timers, the station (602) may decide when to access the medium. In this example, the STA may acquire the wide band access after the NAV1 timer (661) expires on CH1 for BSS1 via sending a wideband PPDU (656) on contiguous channels CH3 and CH4 of 6 GHz band (672) in combining with the transmission (657) on channels CH1 and CH2 in 5 GHz band.

In some embodiment, the MCVS mechanism can be used to track the occupancy information on individual channel of the multi-channels for the distributed multi-AP deployment case.

Figure 7:
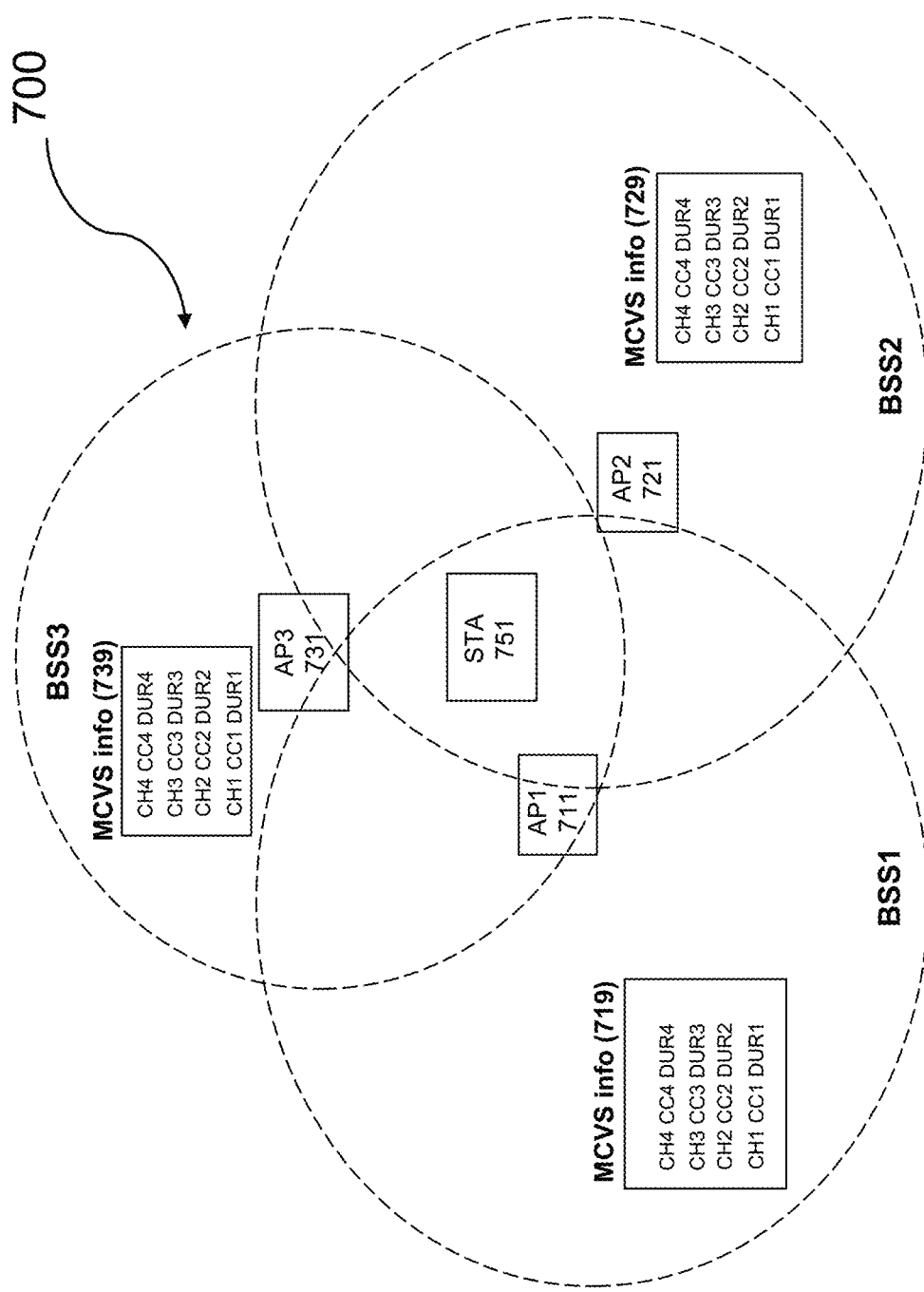
FIG. 7 shows an example of using multi-channel virtual sensing mechanism in coordinated multi-APs deployment.

FIG. 7 illustrates an example of using the multi-channel virtual sensing in the distributed multi-AP deployments. In some embodiment, the AP1 (711), AP2 (721) and AP3 (731) support multi-channel operation on the channel on CH1, CH2, CH3 and CH4 and forms BSS1, BSS2, and BSS3 in an overlapped area. The channel CH1, CH2, CH3 and CH4 may be in the same frequency band of 2.4 GHz, 5 GHz or 6 GHz band, or in different frequency bands, e.g., CH1 and CH2 are in 5 GHz band, while CH3 and CH4 are in 6 GHz band.

The station STA (751) is in the coverage area of multi-BSS of AP1 (711), AP2 (721) and AP3 (731).

The MCVS information (719, 729, or 739) field carries the occupancy information of multi-channel: CH1, CH2, CH3 and CH4, and indicates the occupancy duration of the busy channels. The channel occupancy duration could be measured directly by an AP (711, 721 or 731) itself, i.e. through reading the frame header and decode the Duration field. AP1 (711), AP2 (721) or AP3 (731) then include such information in the MCVS information (719, 729 or 739) in next transmission so that other APs (or STAs) can receive and update their MCVS information accordingly. For example, if a PPDU is received on a particular channel, the AP will update the DUR field of MCVS information (719, 729, or 739) on the corresponding channel accordingly and include the updated MCVS information (719, 729, or 739) in its next transmission. If PPDUs are received over multiple channels, the AP (711, 721, or 731) updates the DUR fields of MCVS associated to those channels to reflect the durations of PPDUs and include the updated MCVS information (719, 729, or 739) in its next transmission. If an AP (e.g. 711) receives an MCVS in a MAC frame, e.g. (729) which is not addressed to it, it updates its NAV array on the corresponding channels and then set those values of the NAV array to the DURs of MCVS (e.g. 719) in the next transmission. In this way the multi-channel virtual sensing mechanism can distribute the channel occupancy information which is ether measured directly by itself or derived from the received MCVS information to all the stations in the multi-AP coverage area.

In some embodiment, the DUR values derived from the MCVS information fields of MAC frames may be used to protect the multi-user (MU) transmissions. The DUR values in MCVS information could be used to form a NAV array which maintains a set of NAV timers on each channel which a BSS is occupying on. The NAV array thus allows each STA to use those NAV timers to track an individual BSS on an individual channel. All the NAV timers are updated based on the received MCVS information and/or with the transmission duration of PPDUs.

Figure 8:
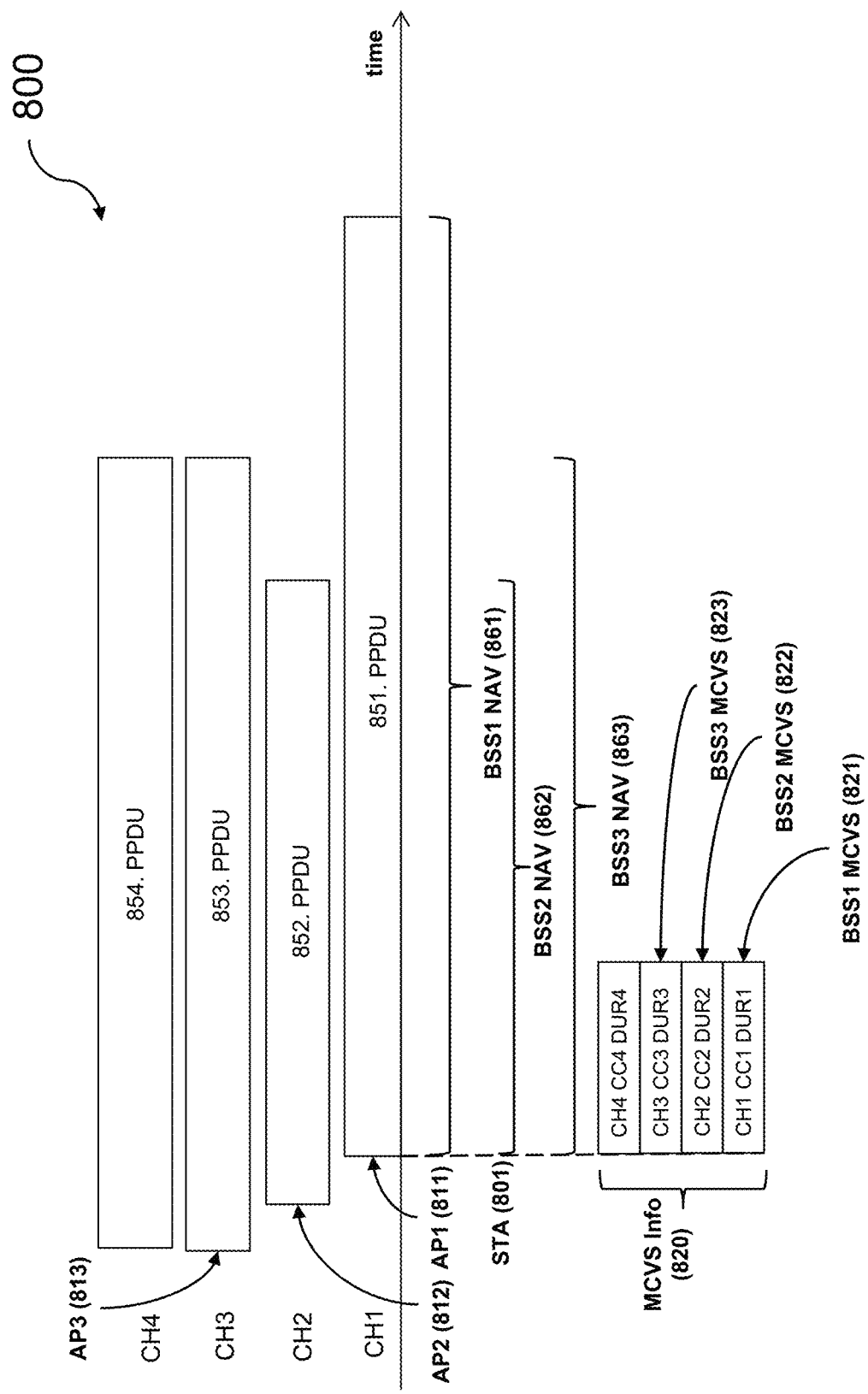
FIG. 8 shows an example of transmitting a frame with the multi-channel virtual sensing information and setting a NAV array.

FIG. 8 illustrates an example of transmitting frames with MCVS information.

The distributed AP1 (811), AP2 (812) and AP3 (813) may transmit the MCVS information in the PPDUs (851, 852, 853 and 854) over multi-channels CH1, CH2, CH3 and CH4. The channel CH1, CH2, CH3 and CH4 may be in the same frequency band, like 2.4 GHz, or 6 GHz band, or may be possible in different frequency bands, e.g., CH1 and CH2 are in band, while CH3 and CH4 are in 6 GHz band. From the received MCVS information (820), a STA (801) knows that the CH1 is occupied by BSS1 through BSS1 MCVS field (821), CH2 is occupied by BSS2 through BSS2 MCVS field (822) and CH3 and CH4 are occupied by BSS3 through BSS3 MCVS field (823). The STA (801) then can set the NAV array for each BSS: a NAV timer for BSS1 (861), a NAV timer for BSS2 (862) and a NAV timer for BSS3 (863).

With the NAV array (861, 862 and 863), the receiving station (801) would know the duration of a channel occupancy and does not transmit a PPDU during the channel occupancy by other stations.

In some embodiment, a station may request to the information of MCVS.

Figure 9:
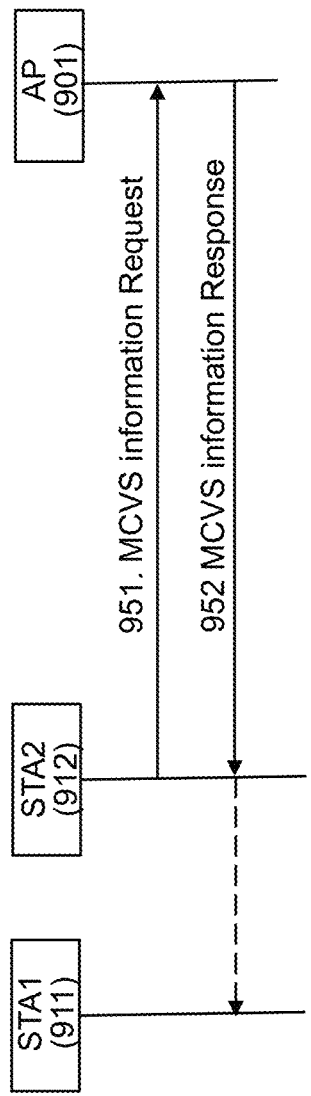
FIG. 9 shows an example of request to multi-channel virtual sensing information.

FIG. 9 illustrates an example of a request to MCVS information.

951. A non-AP station (912) may send a request to the associated AP (901) for the MCVS information. The MCVS information request can be a new control message, or a request indication embedded in an existing control message.

952. Upon receiving this MCVS information request, the AP (901) sends a response message including the MCVS information in any of MAC frame formats shown in FIG. 4(A), (B) or (C). The AP (901) may send the response for the MCVS information request to the requesting station only i.e. STA2 (912) via uni-casting, or to other stations such as STA1 (911) as well via multi-casting/broadcasting.

In addition, the AP (901) may periodically transmit a frame or a message with MCVS information to neighbor stations (911 and/or 912) to share the real-time multi-channel virtual sensing information. Non-AP stations (911 and/or 912) may also carry MCVS information in their transmissions to share with the AP (901) and other non-AP stations the directly measured MCVS or derived MCVS from received transmissions.

Figure 10:
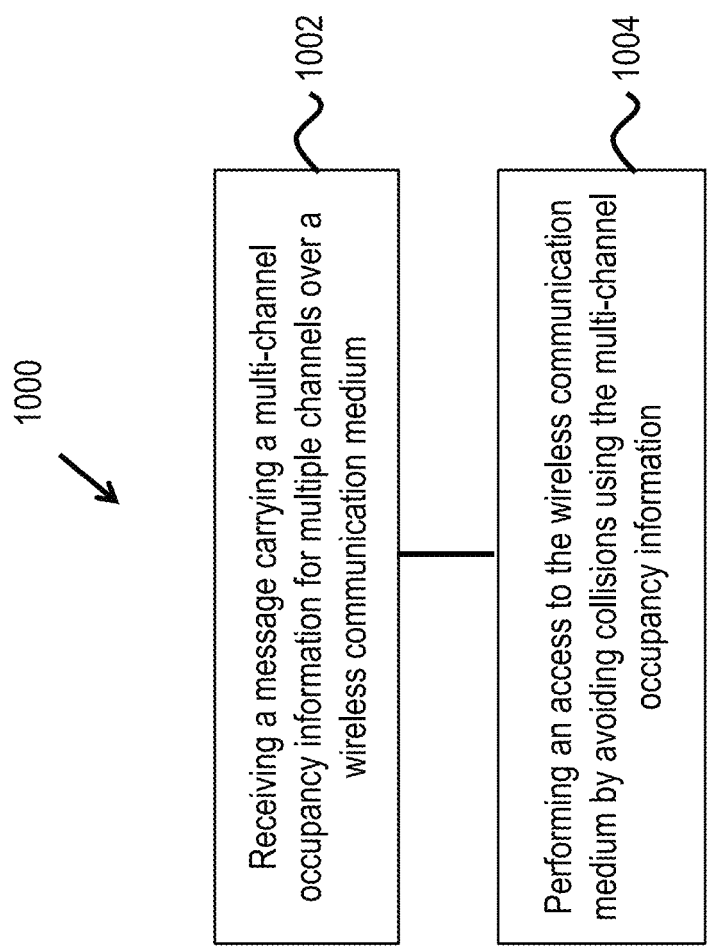
FIG. 10 shows a flowchart for an example method of wireless communication.

FIG. 10 is a flowchart for an example method 1000 of wireless communication. The method 1000 may be implemented by a wireless terminal device such as an STA in 802.11 technology. The method 1000 includes receiving (1002) a message carrying a multi-channel occupancy information for multiple channels over a wireless communication medium. The method 1000 includes performing (1004) an access to the wireless communication medium by avoiding collisions using the multi-channel occupancy information.

In some embodiments, the message comprises the multi-channel occupancy information in a MAC header portion of the message. In some embodiments, the message is included in a payload portion of a MAC frame. In some embodiments, the message may be sent as an information element with a predefined syntax that is known both to transmitting and a receiving device. Some examples of how this message can be carried in a transmission are described with respect to FIGS. 4A-4C.

In some embodiments, the multi-channel occupancy information includes an occupancy state information for each channel of the multiple channels, the occupancy state information having a first value indicating that a corresponding channel is occupied or a second value indicating that the corresponding channel is idle. In some implementations, the multi-channel occupancy information further includes, for a given channel that is occupied, an identifier of a corresponding base station that controls operation of the given channel, and a duration of occupancy of the given channel. Some examples of the syntax used for carrying the information is described with reference to FIGS. 4A-4C and 5 to 8.

In some embodiments, the performing the access includes performing a wideband access using bandwidth from two or more of the multiple channels based on the multi-channel occupancy information. In some embodiments, the highest possible bandwidth may be selected by a wireless device. For example, FIG. 6 shows how a wireless device is able to send a collision free PPDU (PLCP protocol data unit, where PLCP is a physical layer convergence protocol) transmission that occupies bandwidth on two to four channels, based on the multi-channel occupancy information for the channels.

In various implementations, the message may be periodically transmitted by the access point of a network (e.g., a B S S). Alternatively, or in addition, the message may be made available to a wireless terminal based on a request/response type message exchange.

Figure 11:
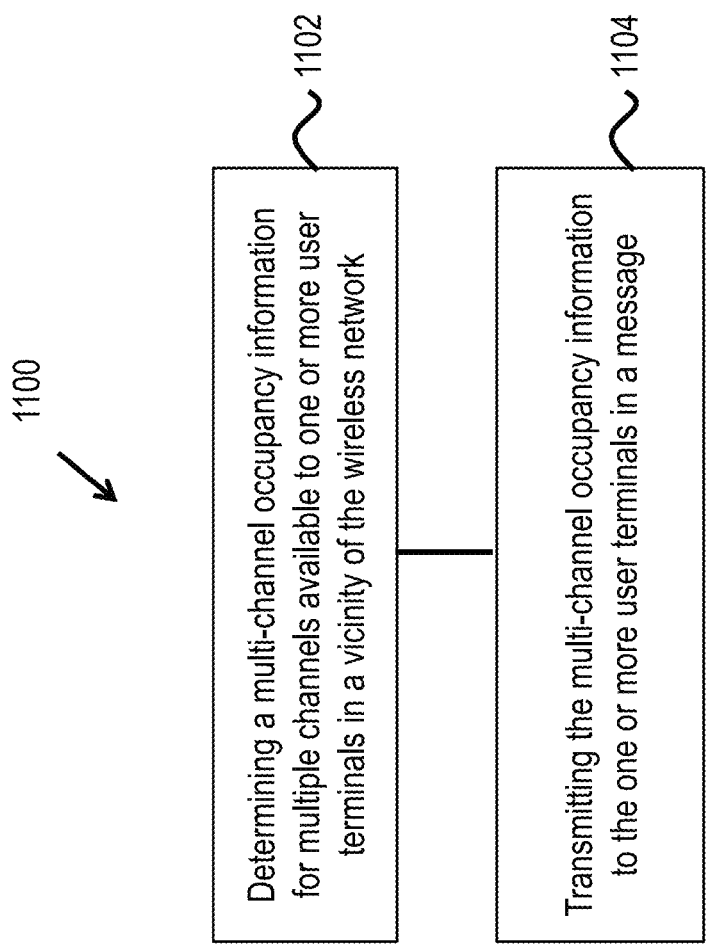
FIG. 11 shows a flowchart for an example method of wireless communication.

FIG. 11 is a flowchart for an example method 1100 of wireless communication. The method 1100 may be implemented by an access point that controls transmissions and operation of a wireless network such as a BSS or another network configuration. The method 1100 includes determining (1102), by an access point of a wireless network, a multi-channel occupancy information for multiple channels available to one or more user terminals in a vicinity of the wireless network. The method 1100 includes transmitting (1104), by the access point, the multi-channel occupancy information to the one or more user terminals in a message. Various embodiments of the message and periodicity of transmission are described with respect to the method 1000. As further described in the present document, in some embodiments, the access point may determine channel occupancy based on transmissions received from other neighboring access points. These transmissions may include information such as the NAV field used in 802.11 communication protocol.

Figure 12:
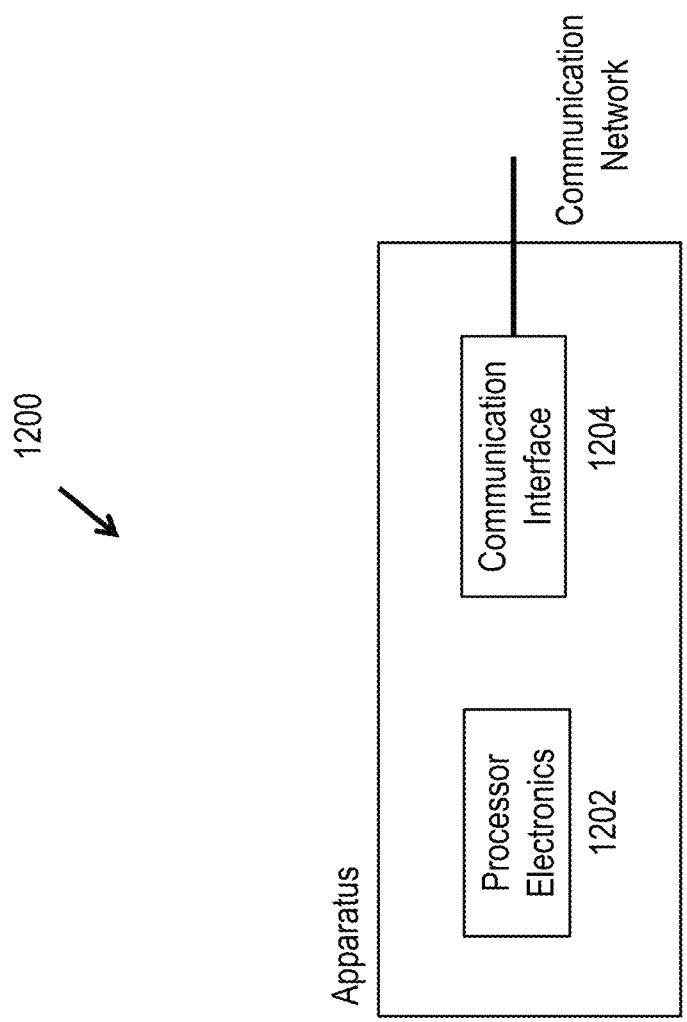
FIG. 12 shows a block diagram of a hardware platform for implementing methods and techniques described in the present document.

FIG. 12 is a block diagram showing a portion of an example apparatus 1200. The apparatus 1200 may be used to implement one or more of the various methods and functions (e.g., the wireless terminal or the access point, etc.) described in the present document. The apparatus 1200 includes processor electronics 1202. The processor electronics 1202 may be programmed to implement the methods described herein. For example, the processor electronics 1202 may read code stored in a memory (not shown in FIG. 12) and execute the code to implement the methods. The apparatus 1200 includes a communication interface 1204 that is communicatively coupled with the processor electronics 1202 and with a communication network. In some embodiments, the communication interface 1204 may be a wireless interface such as a 3G/4G/5G or 802.11 wireless interface, and so on.

It will be appreciated that the present document discloses techniques that may be used by wireless terminals such as user devices in the form of smartphones, tablets, mobile computers, Internet of Things (IoT) devices, and so on, for performing virtual sensing of multiple transmission channels available for transmission/receptions over the wireless (air) communication medium. It will further be appreciated that, using the disclosed techniques, a network device such as the access point, is able to indicate occupancy or availability status of multiple channels to wireless terminals, without the wireless terminals having to have ability to scan multiple channels on their own.

It will further be appreciated that a method of multi-channel virtual sensing mechanism is introduced. Through this multi-channel virtual sensing mechanism, the transmitting station can include the latest channel condition in the multi-channel virtual sensing information of message frames so that the receiving stations can be able to quickly adapt to the change of channel condition.

It will further be appreciated that the multi-channel virtual sensing mechanism allows the receiving station to schedule a transmission on the earliest available channel or larger bandwidth channels in multi-channel operation. The new mechanism also allows receiving stations to set up the NAV timers for multiple BSS on multiple channels.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
receiving, by a wireless terminal, a message carrying a multi-channel occupancy information for multiple channels over a wireless communication medium,
wherein the multi-channel occupancy information includes an occupancy state information for each channel of the multiple channels,
wherein in response to the occupancy state information having a value that indicates that a corresponding channel is occupied, the multi-channel occupancy information further includes an identifier of a corresponding base station that controls operation of the corresponding channel, and a duration of occupancy of the corresponding channel, and
wherein in response to the occupancy state information indicating that a channel is idle, the occupancy state information omits a color code field and a duration field for the channel; and
performing, by the wireless terminal, an access to the wireless communication medium by avoiding collisions using the multi-channel occupancy information.

2. The method of claim 1, wherein the message comprises the multi-channel occupancy information in a medium access control (MAC) header of the message.

3. The method of claim 1, wherein the message comprises an information element that includes the multi-channel occupancy information.

4. The method of claim 1, wherein the message comprises a medium access control (MAC) frame having a payload portion carrying the multi-channel occupancy information.

5. The method of claim 1, wherein the performing the access includes performing a wideband access using bandwidth from two or more of the multiple channels based on the multi-channel occupancy information.

6. The method of claim 1, wherein the message carrying the multi-channel occupancy information is periodically received by the wireless terminal.

7. A wireless communication method, comprising:
determining, by an access point of a wireless network, a multi-channel occupancy information for multiple channels available to one or more user terminals in a vicinity of the wireless network,
wherein the multi-channel occupancy information includes an occupancy state information for each channel of the multiple channels,
wherein in response to the occupancy state information having a value that indicates that a corresponding channel is occupied, the multi-channel occupancy information further includes an identifier of a corresponding base station that controls operation of the corresponding channel, and a duration of occupancy of the corresponding channel, and
wherein in response to the occupancy state information indicating that a channel is idle, the occupancy state information omits a color code field and a duration field for the channel; and
transmitting, by the access point, the multi-channel occupancy information to the one or more user terminals in a message.

8. The method of claim 7, further including:
receiving a wideband transmission that uses bandwidth from two or more of the multiple channels based on the multi-channel occupancy information.

9. The method of claim 7, wherein the access point determines the multi-channel occupancy information based on transmissions of network allocation vectors from multiple other access points corresponding to the multiple channels.

10. A wireless communication apparatus comprising a processor configured to perform a method comprising:
receive a message carrying a multi-channel occupancy information for multiple channels over a wireless communication medium,
wherein the multi-channel occupancy information includes an occupancy state information for each channel of the multiple channels,
wherein in response to the occupancy state information having a value that indicates that a corresponding channel is occupied, the multi-channel occupancy information further includes an identifier of a corresponding base station that controls operation of the corresponding channel, and a duration of occupancy of the corresponding channel, and
wherein in response to the occupancy state information indicating that a channel is idle, the occupancy state information omits a color code field and a duration field for the channel; and
perform an access to the wireless communication medium by avoiding collisions using the multi-channel occupancy information.

11. The wireless communication apparatus of claim 10, wherein the message comprises the multi-channel occupancy information in a medium access control (MAC) header of the message.

12. The wireless communication apparatus of claim 10, wherein the message comprises an information element that includes the multi-channel occupancy information.

13. The wireless communication apparatus of claim 10, wherein the message comprises a medium access control (MAC) frame having a payload portion carrying the multi-channel occupancy information.

14. The wireless communication apparatus of claim 10, wherein the access is performed by the processor configured to perform a wideband access using bandwidth from two or more of the multiple channels based on the multi-channel occupancy information.

15. The wireless communication apparatus of claim 10, wherein the message carrying the multi-channel occupancy information is periodically received.

16. An access point comprising a processor configured to perform a method comprising:
- determine, by the access point of a wireless network, a multi-channel occupancy information for multiple channels available to one or more user terminals in a vicinity of the wireless network,
    - wherein the multi-channel occupancy information includes an occupancy state information for each channel of the multiple channels,
    - wherein in response to the occupancy state information having a value that indicates that a corresponding channel is occupied, the multi-channel occupancy information further includes an identifier of a corresponding base station that controls operation of the corresponding channel, and a duration of occupancy of the corresponding channel, and
    - wherein in response to the occupancy state information indicating that a channel is idle, the occupancy state information omits a color code field and a duration field for the channel; and
- transmit the multi-channel occupancy information to the one or more user terminals in a message.

17. The access point of claim 16, wherein the processor of the access point is configured to determine the multi-channel occupancy information based on transmissions of network allocation vectors from multiple other access points corresponding to the multiple channels.

18. The access point of claim 16, wherein the processor of the access point is further configured to receive a wideband transmission that uses bandwidth from two or more of the multiple channels based on the multi-channel occupancy information.

* * * * *

UNITED STATES PATENT AND TRADEMARK OFFICE
CERTIFICATE OF CORRECTION

PATENT NO. : 11,950,285 B2
APPLICATION NO. : 17/244791
DATED : April 2, 2024
INVENTOR(S) : Yonggang Fang et al.

It is certified that error appears in the above-identified patent and that said Letters Patent is hereby corrected as shown below:

In the Specification

In Column 1, Line 47, delete "(B S S)" and insert --(BSS)--, therefor.
In Column 4, Line 54, delete "STAl1," and insert --STA11,--, therefor.
In Column 4, Line 56, delete "STAl1," and insert --STA11,--, therefor.
In Column 7, Line 50, delete "2.4 GHz, or 6 GHz band," and insert --2.4 GHz, 5 GHz or 6 GHz band,--, therefor.
In Column 7, Line 52, delete "are in band," and insert --are in 5 GHz band,--, therefor.
In Column 8, Lines 61-62, delete "(e.g., a B S S)." and insert --(e.g., a BSS).--, therefor.

Signed and Sealed this
Twenty-first Day of May, 2024

Katherine Kelly Vidal
*Director of the United States Patent and Trademark Office*